US012619352B2

(12) United States Patent　(10) Patent No.:　US 12,619,352 B2
Bazarsky et al.　(45) Date of Patent:　May 5, 2026

(54) STORING MULTIPLE VERSIONS OF PRELOADED CONTENT TO MITIGATE CROSS-TEMPERATURE IMPACT

(71) Applicant: Sandisk Technologies, Inc., Milpitas, CA (US)

(72) Inventors: Alexander Bazarsky, Holon (IL); Ariel Navon, Revava (IL); Eran Sharon, Rishon Lezion (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/608,265

(22) Filed: Mar. 18, 2024

(65) Prior Publication Data

US 2025/0291480 A1　Sep. 18, 2025

(51) Int. Cl.
*G06F 3/06*　(2006.01)
(52) U.S. Cl.
CPC .......... *G06F 3/0604* (2013.01); *G06F 3/0655* (2013.01); *G06F 3/0679* (2013.01)
(58) Field of Classification Search
CPC .............................. G06F 3/0604; G06F 3/0679
See application file for complete search history.

(56) References Cited

U.S. PATENT DOCUMENTS

| 8,423,842 B2 * | 4/2013 | Nakano | G11C 29/50 |
| | | | 714/721 |
| 2014/0297950 A1 * | 10/2014 | Kuwayama | G06F 3/0653 |
| | | | 711/114 |
| 2015/0135023 A1 * | 5/2015 | Mekhanik | G11C 16/0483 |
| | | | 714/704 |
| 2020/0098421 A1 * | 3/2020 | Alsasua | G06F 13/1636 |
| 2021/0311879 A1 * | 10/2021 | Kang | G06F 12/0246 |
| 2024/0264746 A1 * | 8/2024 | Palmer | G06F 3/0653 |

* cited by examiner

*Primary Examiner* — Nicholas A. Paperno
(74) *Attorney, Agent, or Firm* — DENTONS Durham Jones Pinegar

(57) ABSTRACT

A data storage device includes a cross-temperature mitigation system that mitigates cross-temperature issues that arise when preloaded content is read from the data storage device. The data storage device stores different copies of preloaded content, and each copy of preloaded content is written to the data storage device when the data storage device is operating at different temperatures. When a request to read preloaded content is received, the cross-temperature mitigation system determines a current operating temperature of the data storage device and determines which copy of preloaded content has a write temperature that is closest to the current operating temperature of the data storage device. When a particular copy of preloaded content is identified, that particular copy of preloaded content is decoded in the storage controller and the decoded data is returned to a host device.

20 Claims, 5 Drawing Sheets

300

RECEIVE COMMAND FROM HOST DEVICE — 310

REQUEST FOR PRELOADED CONTENT? — 320

NO — EXECUTE COMMAND — 330

YES — DETERMINE CURRENT OPERATING TEMPERATURE OF DATA STORAGE DEVICE — 340

SELECT COPY OF PRELOADED CONTENT BASED ON CURRENT OPERATING TEMPERATURE — 350

DECODE COPY OF PRELOADED CONTENT — 360

RETURN DECODED COPY OF PRELOADED CONTENT TO HOST DEVICE — 370

200

400

MONITOR STORAGE CAPACITY OF
DATA STORAGE DEVICE  410

420
CAPACITY OVER
A THRESHOLD?

NO

YES

DETERMINE ACCESS FREQUENCY
OF EACH COPY OF PRELOADED
CONTENT  430

DELETE COPY OF PRELOADED
CONTENT BASED ON ACCESS
FREQUENCY  440

STORING MULTIPLE VERSIONS OF PRELOADED CONTENT TO MITIGATE CROSS-TEMPERATURE IMPACT

BACKGROUND

Cross-temperature issues arise in various embedded data storage devices and is particularly prevalent when preloaded content is stored in the data storage device. Cross-temperature issues are the result of data being read from the data storage device when the data storage device is operating at a temperature that is significantly different from a temperature at which the data storage device was operating when the data was initially written to the data storage device.

Cross-temperature issues typically increase the bit error rate (BER) of data when the data is read. When the BER of data increases, the need for more robust error correction capabilities increases, as does the amount of time required to complete any error correction processes.

Currently, cross-temperature issues may be mitigated using read threshold calibrations and different decoding optimizations (that may include reading soft bits) in the data storage device. However, these solutions require significant overhead, which reduces the overall performance of the data storage device.

Accordingly, it would be beneficial for a data storage device to mitigate cross-temperature issues that affect preloaded content without negatively impacting the performance capabilities of the data storage device.

SUMMARY

The present disclosure describes a cross-temperature mitigation system that is associated with a data storage device. The cross-temperature mitigation system acts to mitigate cross-temperature issues that arise when preloaded content is read from a data storage device. Although the examples described herein relate to preloaded content, the cross-temperature mitigation system may be used to mitigate any cross-temperature issues.

Preloaded content is data that is not written organically by a host device. Rather, the preloaded content is written to the data storage device in a factory setting before a customer receives the data storage device. As will be explained in greater detail herein, the data storage device stores different copies of preloaded content. In an example, each copy of preloaded content is written to the data storage device when the data storage device is operating at different temperatures. In another example, each copy of preloaded content is written to the data storage device using one or more write parameters that simulate the data storage device operating at different temperatures.

When a request to read preloaded content is received (e.g., from a host device), the cross-temperature mitigation system determines a current operating temperature of the data storage device. The cross-temperature mitigation system determines which copy of preloaded content has a write temperature that is closest to the current operating temperature of the data storage device. When a particular copy of preloaded content is identified, that particular copy of preloaded content is decoded by the storage device and the decoded data returned to the host device.

Accordingly, examples of the present disclosure describe a method that includes receiving a read command from a host device. In an example, the read command is associated with preloaded content that is stored by a data storage device. Based, at least in part, on receiving the read command, an operating temperature of the data storage device is determined. A first copy of the preloaded content that is associated with a first write temperature or a second copy of the preloaded content that is associated with a second write temperature that is different than the first write temperature is identified and/or selected. In an example, the copy of the preloaded content is selected based, at least in part, on the determined operating temperature. The selected first copy of the preloaded content or the selected second copy of the preloaded content is decoded by the storage device, and the decoded data provided to the host device.

Other examples describe a data storage device that includes a controller and a cross-temperature mitigation system. In an example, the cross-temperature mitigation system is operable to determine an operating temperature of the data storage device. The cross-temperature mitigation system also selects one of a first copy of preloaded content that is associated with a first write temperature and a second copy of preloaded content that is associated with a second write temperature that is different than the first write temperature. In an example, the selection is based, at least in part, on the determined operating temperature. The cross-temperature mitigation system also decodes and returns the decoded selected first copy of preloaded content or the selected second copy of preloaded content to a host device.

In another example, the present disclosure describes a data storage device having a controller means and a means for determining an operating temperature of the data storage device. In an example, the data storage device also includes a means for selecting one of a first copy of preloaded content that is associated with a first write temperature and a second copy of preloaded content that is associated with a second write temperature that is different than the first write temperature. In an example, the selection is based, at least in part, on the determined operating temperature of the data storage device. The data storage device also includes means for decoding and returning the selected first copy of preloaded content or the selected second copy of preloaded content to a host device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
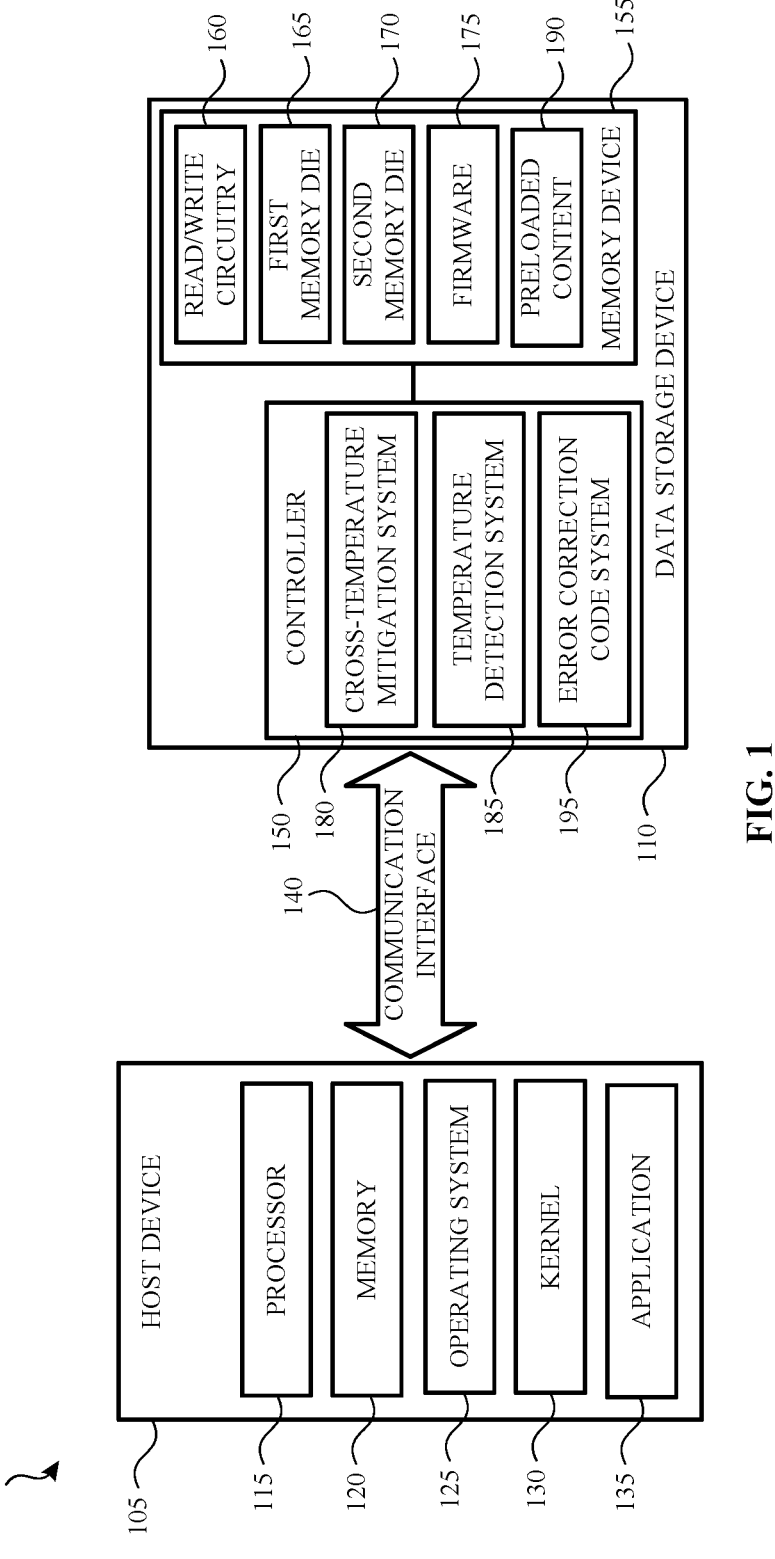
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

As previously described, cross-temperature issues arise in various embedded storage devices. Cross-temperature issues are the result of data being read from the data storage device when the data storage device is operating at a temperature that is significantly different from a temperature at which the data storage device was operating when the data was initially written.

Preloaded content is particularly susceptible to cross-temperatures issues. As used herein, preloaded content is data that is not received and/or written organically by a host device. Rather, the preloaded content is written to the data storage device in a factory setting before a customer receives the data storage device. Preloaded content often contains very important information, such as operating system firmware, related files and so on. In the automotive space, preloaded content may include large volume of storage data such as, for example, high-resolution geographics, road maps, music, movies and so on.

To mitigate the effects of cross-temperatures issues, the data storage device stores different copies of the preloaded content. In an example, while in a factory setting, each copy of the preloaded content is written to the data storage device when the data storage device is operating at different temperatures. In another example, each copy of the preloaded content is written to the data storage device in the factory setting using one or more write parameters that simulate the data storage device operating at different temperatures.

When the data storage device is in use and receives, from a host device, a request for the preloaded content, a cross-temperature mitigation system of the data storage device determines a current operating temperature of the data storage device. The cross-temperature mitigation system determines which copy of preloaded content has a write temperature that is closest to the current operating temperature of the data storage device. In another example, the cross-temperature mitigation system identifies which copy of preloaded content will require the least amount of error correction and/or enable the most efficient use of resources (e.g., when compared with other copies of the preloaded content). When a particular copy of preloaded content is identified, that particular copy of preloaded content is decoded by the data storage device and the decoded data returned to the host device.

Over time, additional data will be written to the data storage device and capacity may decrease. As a result, the cross-temperature mitigation system also determines whether to erase one or more copies of the preloaded content. In an example, the copy (or copies) that is selected for erasure is a copy that is the least used or the least recently used or is associated with an operating temperature that is not reached or has not been reached in a period of time.

In accordance with the above, many technical benefits may be realized including, but not limited to, mitigating the effects of cross-temperature issues and increasing the performance of a data storage device by reducing an amount of resources that are needed for error correction processes.

These benefits, along with other examples, will be shown and described in greater detail with respect to FIG. 1-FIG. 6.

FIG. 1 is a block diagram of a system 100 that includes a host device 105 and a data storage device 110 according to an example. In an example, the host device 105 includes a processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 includes a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

In some examples, the data storage device 110 is attached to, or embedded within, the host device 105. In another example, the data storage device 110 is a component (e.g., a solid-state drive (SSD)) of a network accessible data storage system, a network-attached storage system, a cloud data storage system, and the like. In yet other examples, the data storage device 110 is implemented as an external device or a portable device that can be communicatively or selectively coupled to the host device 105. For example, the data storage device 110 is a USB drive or a USB data storage device and is communicatively coupled to the host device 105 using one or more host interfaces (e.g., a USB interface).

The data storage device 110 includes a controller 150 and a memory device 155. The controller 150 is communicatively coupled to the memory device 155. In an example, the memory device 155 includes one or more memory dies (e.g., a first memory die 165 and a second memory die 170). Although two memory dies are shown, the memory device 155 may include any number of memory dies (e.g., one memory die, two memory dies, eight memory dies, or another number of memory dies). Additionally, although memory dies are specifically mentioned, the memory device 155 may include any non-volatile memory device, storage device, storage elements or storage medium including NAND flash memory cells and/or NOR flash memory cells.

The memory cells can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

One or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

The memory device 155 also includes or stores preloaded content 190. The preloaded content 190 is stored in one or both of the memory dies of the memory device 155. In an example, the preloaded content 190 is written to the memory device 155 (or the data storage device 110) in a factory setting or before a customer receives the memory device 155/data storage device 110.

In an example, the preloaded content 190 includes firmware 175, operating system files and so on. In another example, the preloaded content 190 includes large volumes of storage data. In some examples, such as automotive applications, the preloaded content 190 includes high-resolution geographics and road maps, music, movies and so on. Although specific examples are given, the preloaded content 190 may be any type of data or content.

In an example, the preloaded content 190 includes one or more copies of the preloaded content. Additionally, each copy of preloaded content is written to the data storage device 110 at a different operating temperature. For example, when the data storage device 110 is in a factory setting (e.g., before the data storage device 110 is provided to a customer or end user), a first copy of the preloaded content 190 is written to the data storage device 110 when the data storage device is physically operating at a first temperature. For example, when in the factory, the operating temperature of the data storage device 110 is physically manipulated to operate at a first temperature. When the first temperature is reached, the first copy of the preloaded content is written to the data storage device 110.

Likewise, a second copy of the preloaded content 190 is written to the data storage device 110 when the data storage device is operating at a second temperature that is different than the first temperature. This process may be repeated any number of times until a desired number of copies of preloaded content, each associated with different operating temperatures, are stored by the data storage device 110.

In another example, instead of physically changing the operating temperature of the data storage device 110 in the factory setting, one or more write parameters associated with the preloaded content are changed. In an example, the write parameters are changed to simulate the data storage device 110 operating at different operating temperatures. In an example, the write parameters that are changed are parameters that are associated with a temperature coefficient of one or more memory cells in one or more of the first memory die 165 and/or the second memory die 170. Adjusting or changing the write parameters causes the memory cells, or the memory dies, to behave as if they are operating at different operating temperatures.

As previously described, the data storage device 110 includes a controller 150. The controller 150 is communicatively coupled to the memory device 155 via a bus, an interface or other communication circuitry. In an example, the communication circuitry includes one or more channels that enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170.

The controller 150 includes circuitry for executing instructions. For example, the controller 150 includes one or more processors, one or more microcontrollers, one or more DSPs, one or more ASICs, one or more FPGAs, hard-wired logic, analog circuitry and/or a combination thereof. In another example, the controller 150 includes a SoC or multiple SoCs. Although a single controller 150 is shown and described, the data storage device 110 can include multiple controllers 150. In such examples, each controller 150 is responsible for particular operations (or a subset of operations) described herein.

In an example, the controller 150 receives instructions from the host device 105. In another example, the instructions originate from firmware 175 associated with the data storage device 110 and/or the memory device 155.

In addition to receiving commands and/or data from the host device, the controller 150 also sends data, such as preloaded content 190, to the host device 105. For example, the controller 150 sends data to and/or receives data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155. The controller 150 may also send data and/or commands associated with one or more background scanning operations, garbage collection operations, and/or wear leveling operations.

The controller 150 may also send one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

In an example, the controller 150 includes, or is otherwise associated with, a cross-temperature mitigation system 180 and a temperature detection system 185. Although the cross-temperature mitigation system 180 and the temperature detection system 185 are shown separately, the temperature detection system 185 may be part of the cross-temperature mitigation system 180 and vice versa. Additionally, the cross-temperature mitigation system 180 and/or the temperature detection system 185 may be packaged functional hardware units designed for use with other components/systems, a portion of a program code (e.g., software or firmware) executable by a processor or processing circuitry, or a self-contained hardware and/or software component that interfaces with other components and/or systems.

In an example, the cross-temperature mitigation system 180 is operable to determine which copy of preloaded content 190 to return to the host device 105 when a read command, associated with the preloaded content 190, is received by the controller 150. For example, when a read command is received by the controller 150, the cross-temperature mitigation system 180 determines a current operating temperature of the data storage device 110.

In an example, the current operating temperature of the data storage device 110 is determined by and/or received from the temperature detection system 185. For example, the temperature detection system 185 includes a temperature probe, a temperature sensor or other temperature measurement device that enables the temperature detection system 185 to determine or identify a current operating temperature of the data storage device 110. When the temperature detection system 185 determines the current operating temperature of the data storage device 110, the determined operating temperature is provided to the cross-temperature mitigation system 180.

The cross-temperature mitigation system 180 uses the operating temperature to determine which copy of the preloaded content 190 to return to the host device 105 based, at least in part, on the temperature, or simulated temperature, at which each copy of preloaded content 190 was written to the data storage device 110. In an example, the cross-temperature mitigation system 180 makes the determination based on which copy of preloaded content 190 is associated with a temperature that is closest to the determined operating temperature of the data storage device 110. For example, if the determined operating temperature of the data storage device 110 is ten degrees Celsius, the cross-temperature mitigation system 180 selects a copy of preloaded content that was written to the data storage device at twenty degrees Celsius.

In another example, the cross-temperature mitigation system 180 makes the determination on performance metrics or characteristics associated with each copy of preloaded content 190 and the determined operating temperature of the data storage device. For example, the cross-temperature mitigation system 180 accesses a table or chart that includes information regarding a temperature at which a copy of preloaded content 190 was written, a range of operating temperatures that the copy of preloaded content is useable with and performance metrics associated with the range of temperatures.

Figure 2:
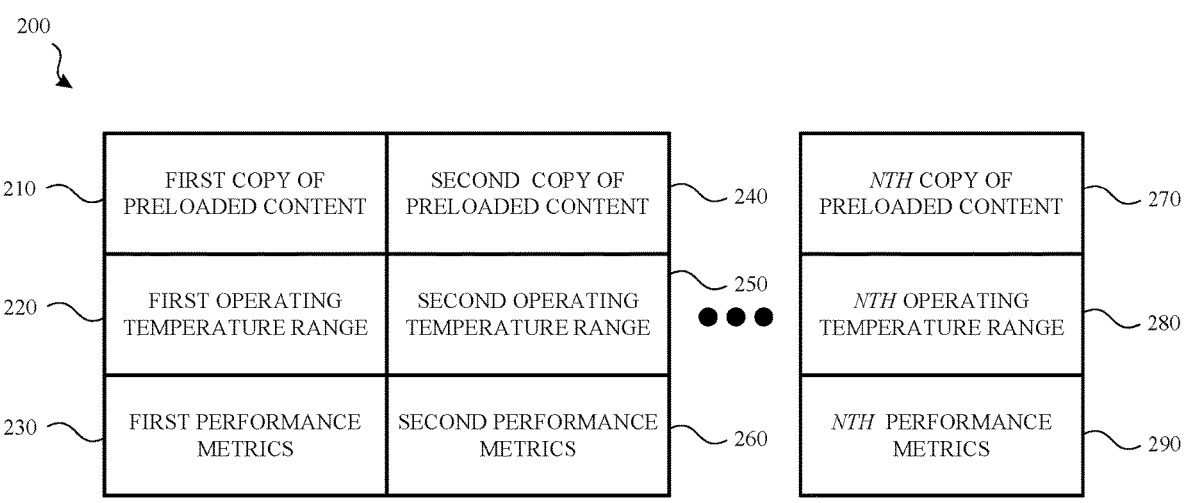
FIG. 2 illustrates a table that shows how different copies of preloaded content are associated with different performance metrics according to an example.

For example and referring to FIG. 2, FIG. 2 illustrates a table 200 that shows how different copies of preloaded content are associated with different performance metrics according to an example. In an example, the information in the table 200 is generated during a factory setting and is made available to a data storage device and/or a cross-temperature mitigation system, such as, for example, the data storage device 110 (FIG. 1) and/or the cross-temperature mitigation system 180 (FIG. 1).

In this example, multiple copies of preloaded content have been stored on the data storage device. Further, each copy of preloaded content is associated with a different temperature or range of temperatures. For example, a first copy of preloaded content 210 is associated with a first operating temperature range 220 or is associated with a particular operating temperature (either a physical operating temperature or a simulated operating temperature).

Likewise, a second copy of preloaded content 240 is associated with a second operating temperature range 250. In an example, the first operating temperature range 220 is different from the second operating temperature range 250. In another example, the first operating temperature range 220 and the second operating temperature range 250 at least partially overlap. Additionally, the data storage device includes an Nth copy of preloaded content 270. The Nth copy of preloaded content 270 is associated with a Nth operating temperature range 280.

As shown in FIG. 2, each copy of preloaded content is associated with performance metrics. For example, the first copy of preloaded content 210 is associated with first performance metrics 230, the second copy of preloaded content 240 is associated with second performance metrics 260 and the Nth copy of preloaded content 270 is associated with Nth performance metrics.

When the cross-temperature mitigation system determines the current operating temperature of the data storage device, the cross-temperature mitigation system checks the table 200 and determines, based on the performance metrics in the table and the operating temperature range, whether to choose the first copy of preloaded content 210, the second copy of preloaded content 240 or the Nth copy of preloaded content 270. The determined copy of preloaded content is decoded and provided to the host device. For example, and referring back to FIG. 1, the determined copy of preloaded content 190 is decoded (e.g., ECC decoded by an error correction code system 195) and subsequently returned to the host device 105.

In an example, the cross-temperature mitigation system 180 is also operable to determine whether and when one or more copies of the preloaded content 190 should be deleted or erased from the data storage device 100. In an example, the cross-temperature mitigation system 180 deletes portions of one or more copies of the preloaded content 190. For example, different portions of preloaded content 190 may be designated as more important when compared with other portions. In such an example, the more important portions of the preloaded content 190 would not be deleted (or would be deleted after the less important portions are deleted). In another example, the cross-temperature mitigation system 180 deletes the entire copy of preloaded content 190.

In an example, the cross-temperature mitigation system 180 determines to delete or erase the one or more copies of preloaded content 190 based on a determined storage capacity of the data storage device 110. For example, if the data storage device reaches a threshold amount stored data, the cross-temperature mitigation system 180 determines to free up additional space on the data storage device by deleting one or more copies of the preloaded content. In an example, the copies of preloaded content are ranked according to one or more metrics. In an example, the one or more metrics include, but are not limited to, a least recently used copy, a least recently used temperature range and so on.

When the one or more copies are identified for deletion, the cross-temperature mitigation system 180 causes the one or more copies (or portions of the one or more copies) to be erased. In an example, the deletion of the one or more copies are part of a garbage collection operation that is executed as a background process of the data storage device 110.

In an example, prior to deletion, the copy of preloaded content 190 that is selected for deletion is used to correct one or more errors that may be present in a copy of preloaded content 190 that is being kept. For example, the cross-temperature mitigation system 180 or an error correction system compares the various copies of preloaded content 190 and uses a majority rule approach to determine whether any errors are present in the copy (or copies) of preloaded content 190 that will be kept. Reading several versions of the same preloaded content can improve the reliability readings of error correction code (ECC) in low-density parity check (LDPC) codes and other ECC mechanisms.

In another example, the different copies of preloaded content 190 may be used for improved decoder initialization. For example, the copies of preloaded content 190 may be used for setting log likelihood ratio (LLR) values of each of the codeword bits as a function of the value of the corresponding bit within the multiple copies. For example, each bit is assigned a bit reliability as a function of the level of agreement among the multiple copies. This will improve the read throughput and correction capability of the LDPC decoder.

Figure 3:
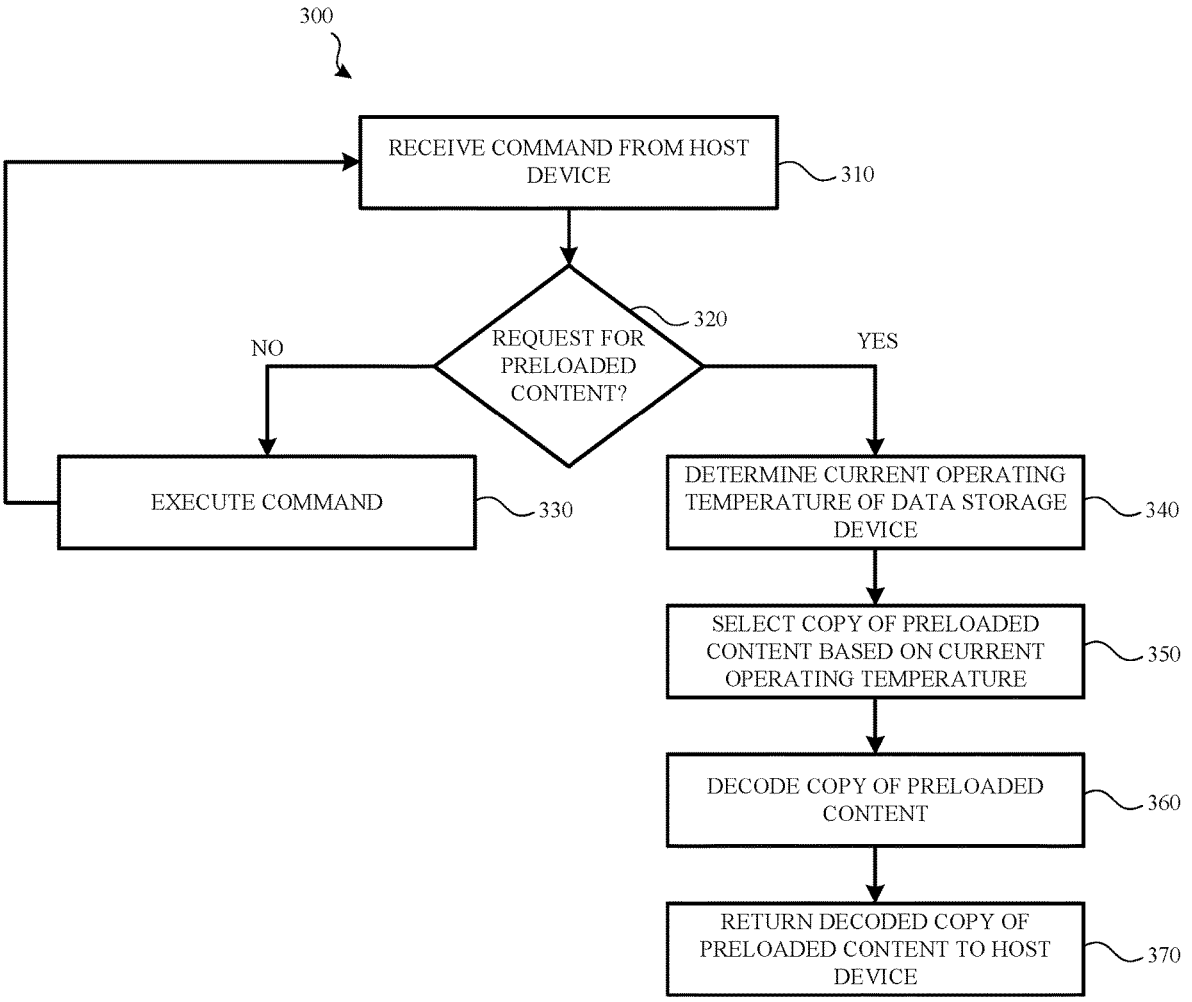
FIG. 3 illustrates a method for selecting a copy of preloaded content to return to a host device based on a determined operating temperature of a data storage device according to an example.

FIG. 3 illustrates a method 300 for selecting a copy of preloaded content to return to a host device based on a determined operating temperature of a data storage device according to an example. In an example, the method 300 is performed by a cross-temperature mitigation system of a data storage device, such as, for example, the cross-temperature mitigation system 180 shown and described with respect to FIG. 1.

Additionally, in an example, the data storage device includes two or more copies of preloaded content. Each copy of preloaded content is written to the data storage device at different physical operating temperatures or at different simulated operating temperatures.

Method 300 begins when the data storage device receives (310) a command from a host device. In an example, the command is received by a controller (e.g., the controller 150 (FIG. 1)). When the command is received, the controller determines (320) whether the command is a read command that requests data associated with the preloaded content. For example, the controller accesses metadata associated with the command to determine the type and/or the location of the data associated with received command.

If the controller determines (320) that the command is not a request for preloaded content, the controller causes the command to be executed (330) and the method 300 is repeated. However, if the controller determines (320) that the command is a request for preloaded content, the controller causes the cross-temperature mitigation system to determine (340) a current operating temperature of the data storage device. For example, the cross-temperature mitigation system accesses or otherwise causes a temperature detection system (e.g., temperature detection system 185 (FIG. 1)) to measure the current operating temperature of the data storage device using a temperature detection circuit, a temperature detection sensor or any other temperature reading device.

When the current operating temperature of the data storage device is determined, the cross-temperature mitigation system compares the current operating temperature to a write temperature, or a range of temperatures, associated with each copy of preloaded content. In an example, the write temperature, or the range of temperatures, associated with each copy of preloaded content is a physical write temperature. For example, each copy of preloaded content is written to the data storage device when the data storage device was physically operating at different temperatures.

In another example, the write temperature, or the range of temperatures, associated with each copy of preloaded content is a simulated write temperature. For example, one or more write parameters associated with each copy of preloaded content are manipulated or changed such that a temperature coefficient associated with one or more memory cells of the data storage device model different write temperatures from the perspective of the memory cell. The cross-temperature mitigation system then selects (350) a copy of preloaded content based, at least in part, on the comparison.

In an example, the cross-temperature mitigation system selects a particular copy of preloaded content based on a determination as to which copy of preloaded content is associated with a write temperature that is closest to the determined operating temperature of the data storage device 110. For example, if the determined operating temperature of the data storage device is ten degrees Celsius, the cross-temperature mitigation system selects the copy of preloaded content that was written to the data storage device at twenty degrees Celsius rather than the copy of preloaded content that was written at fifty degrees Celsius.

In another example, the cross-temperature mitigation system makes the determination on performance metrics or characteristics associated with each copy of preloaded content. For example, the cross-temperature mitigation system accesses a table (e.g., the table 200 FIG. 2)) that includes information regarding a temperature at which each copy of preloaded content was written, a range of operating temperatures that the copy of preloaded content should be selected for and/or performance metrics associated with the range of temperatures.

When a particular copy of preloaded content is identified and/or selected, the selected copy of preloaded content is decoded (360) and the decoded copy of preloaded content is returned (370) to the host device.

Figure 4:
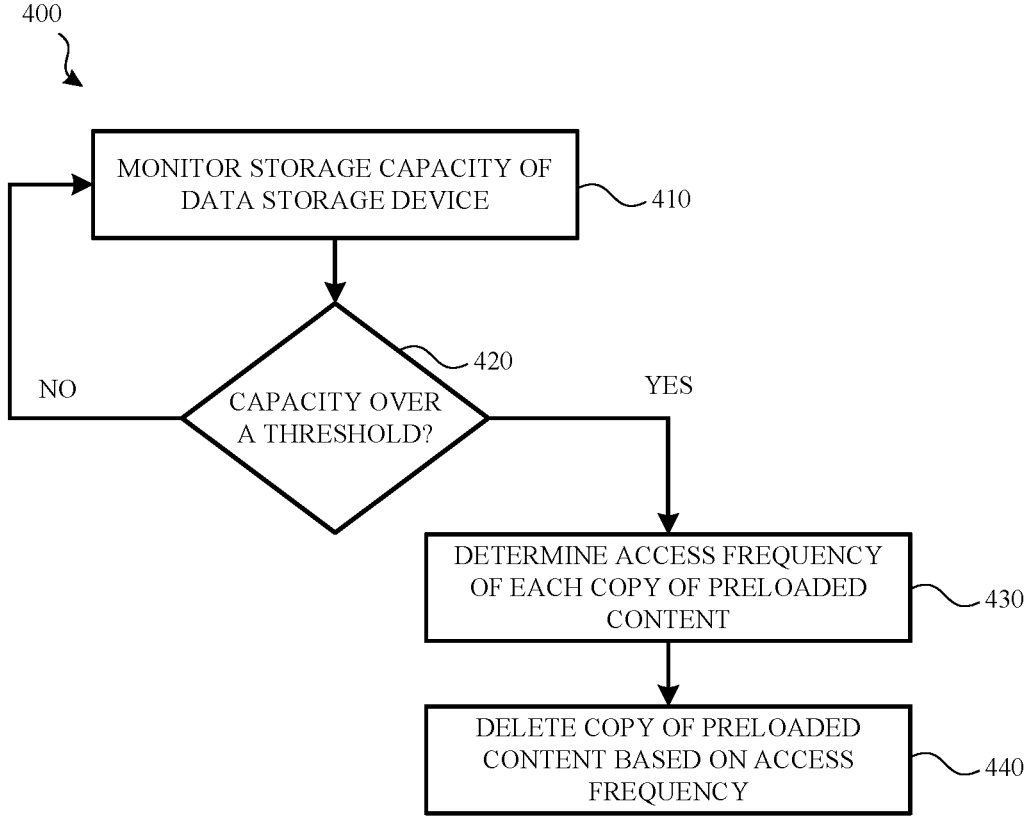
FIG. 4 illustrates a method for deleting a copy of preloaded content from a data storage device according to an example.

FIG. 4 illustrates a method 400 for deleting a copy of preloaded content from a data storage device according to an example. In an example, the method 400 is performed by a cross-temperature mitigation system of a data storage device such as, for example, the cross-temperature mitigation system 180 shown and described with respect to FIG. 1.

In an example, the method 400 begins when a current capacity of the data storage device is determined (410). In an example, the determination about the capacity of the data storage device is continuously monitored. In another example, the capacity of the data storage device is periodically monitored.

A determination is made as to whether the capacity of the data storage device is over a threshold (420). If the controller and/or the cross-temperature mitigation system determines that the capacity of the data storage device is not over a threshold, the method 400 is repeated. However, if the controller and/or the cross-temperatures mitigation system determines (420) that the capacity of the data storage device had reached or exceeds a capacity threshold, the cross-temperature mitigation system determines (430) an access frequency of one or more copies of the preloaded content.

In an example, the access frequency includes a determination as to which copies of preloaded content are used most frequently or most recently. In another example, the different copies of preloaded content are dynamically ordered. In such examples, the ordering of the copies of preloaded content is based, at least in part, on an extrapolation of recently used read temperatures and/or by accumulating statistics about the overall frequency of the occurring read temperatures. For example, a copy of preloaded content that has a write temperature that is associated with an operating temperature that has not been reached (or has not been reached for over a threshold period of time) will be erased before a copy of preloaded content that is associated with an operating temperature that was reached more recently.

Based, at least in part, on the determined access frequency, an identified copy (or one or more portions of the identified copy) of preloaded content is deleted (440).

Figures 5, 6:
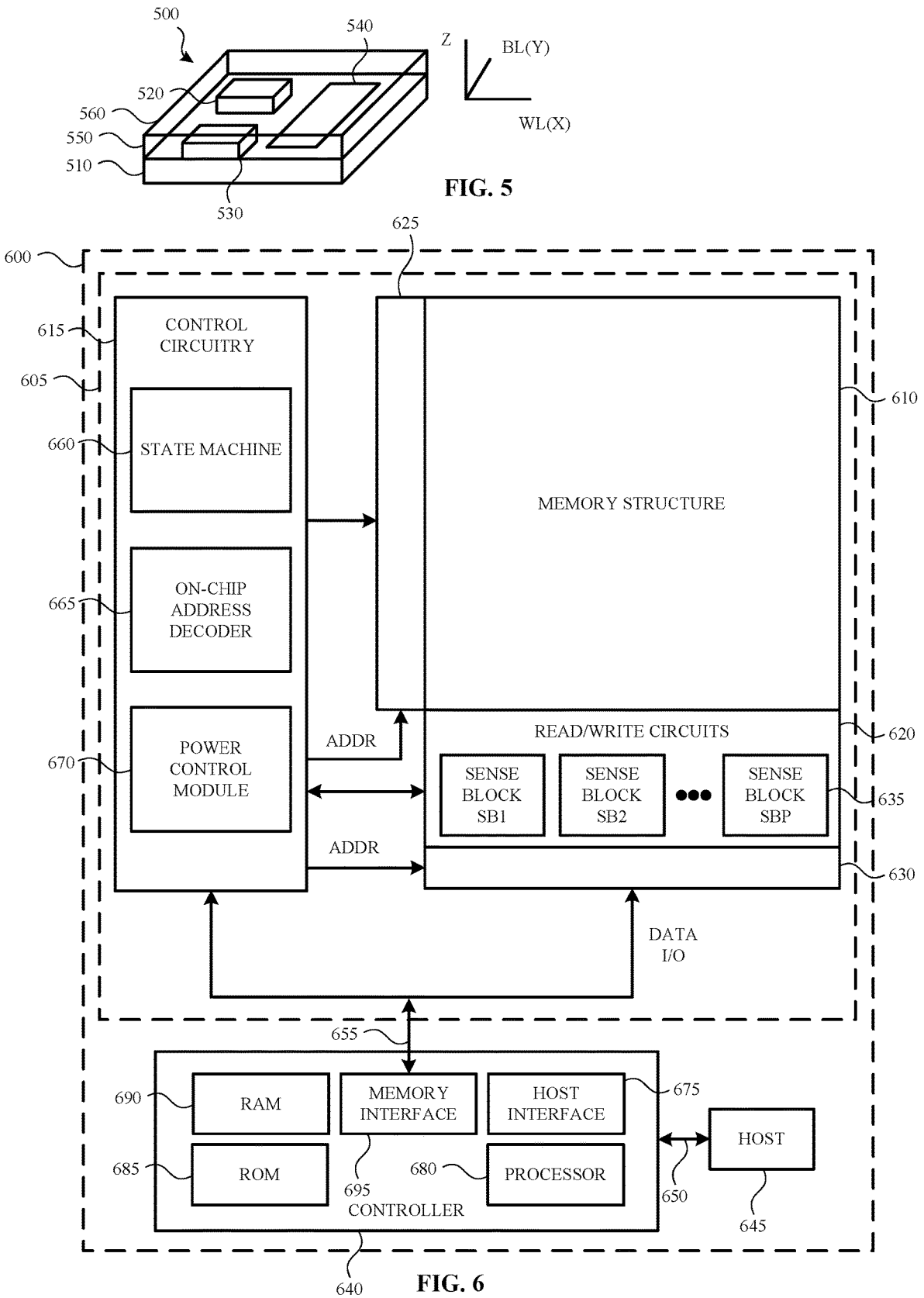
FIG. 5 is a perspective view of a storage device that includes three-dimensional (3D) stacked non-volatile memory according to an example.
FIG. 6 is a block diagram of a storage device according to an example.

FIG. 5-FIG. 6 describe example storage devices that may be used with or otherwise implement the various features described herein. For example, the storage devices shown and described with respect to FIG. 5-FIG. 6 may include various systems and components that are similar to the systems and components shown and described with respect to FIG. 1. For example, the controller 640 shown and described with respect to FIG. 6 may be similar to the controller 150 of FIG. 1. Likewise, the memory dies 605 may be similar to the first memory die 165 and/or the second memory die 170 of FIG. 1.

FIG. 5 is a perspective view of a storage device 500 that includes three-dimensional (3D) stacked non-volatile memory according to an example. In this example, the storage device 500 includes a substrate 510. Blocks of memory cells are included on or above the substrate 510. The blocks may include a first block (BLK0 520) and a second block (BLK1 530). Each block may be formed of memory cells (e.g., non-volatile memory elements). The substrate 510 may also include a peripheral area 540 having support circuits that are used by the first block and the second block.

The substrate 510 may also carry circuits under the blocks, along with one or more lower metal layers which are patterned in conductive paths to carry signals from the circuits. The blocks may be formed in an intermediate region 550 of the storage device 500. The storage device may also include an upper region 560. The upper region 560 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 510 in the x-direction represents a direction in which signal paths for word lines or control gate lines extend (e.g., a word line or drain-end select gate (SGD) line direction) and the width of the plane of the substrate 510 in the y-direction represents a direction in which signal paths for bit lines extend (e.g., a bit line direction). The z-direction represents a height of the storage device 500.

FIG. 6 is a functional block diagram of a storage device 600 according to an example. In an example, the storage device 600 may be the 3D stacked non-volatile storage device 500 shown and described with respect to FIG. 5. The components depicted in FIG. 6 may be electrical circuits. In an example, the storage device 600 includes one or more memory dies 605. Each memory die 605 includes a three-dimensional memory structure 610 of memory cells (e.g., a 3D array of memory cells), control circuitry 615, and read/write circuits 620. In another example, a two-dimensional array of memory cells may be used. The memory structure 610 is addressable by word lines using a first decoder 625 (e.g., a row decoder) and by bit lines using a second decoder 630 (e.g., a column decoder). The read/write circuits 620 may also include multiple sense blocks 635 including SB1, SB2, . . . , SBp (e.g., sensing circuitry) which allow pages of the memory cells to be read or programmed in parallel. The sense blocks 635 may include bit line drivers.

In an example, a controller 640 is included in the same storage device 600 as the one or more memory dies 605. In another example, the controller 640 is formed on a die that is bonded to a memory die 605, in which case each memory die 605 may have its own controller 640. In yet another example, a controller die controls all of the memory dies 605.

Commands and data may be transferred between a host 645 and the controller 640 using a data bus 650. Commands and data may also be transferred between the controller 640 and one or more of the memory dies 605 by way of lines 655. In one example, the memory die 605 includes a set of input and/or output (I/O) pins that connect to lines 655.

The memory structure 610 may also include one or more arrays of memory cells. The memory cells may be arranged in a three-dimensional array or a two-dimensional array. The memory structure 610 may include any type of non-volatile memory that is formed on one or more physical levels of arrays of memory cells having an active area disposed above a silicon substrate. The memory structure 610 may be in a non-volatile memory device having circuitry associated with the operation of the memory cells, whether the associated circuitry is above or within the substrate.

The control circuitry 615 works in conjunction with the read/write circuits 620 to perform memory operations (e.g., erase, program, read, and others) on the memory structure 610. The control circuitry 615 may include registers, ROM fuses, and other devices for storing default values such as base voltages and other parameters.

The control circuitry 615 may also include a state machine 660, an on-chip address decoder 665 and a power control module 670. The state machine 660 may provide chip-level control of various memory operations. The state machine 660 may be programmable by software. In another example, the state machine 660 does not use software and is completely implemented in hardware (e.g., electrical circuits).

The on-chip address decoder 665 may provide an address interface between addresses used by host 645 and/or the controller 640 to a hardware address used by the first decoder 625 and the second decoder 630.

The power control module 670 may control power and voltages that are supplied to the word lines and bit lines during memory operations. The power control module 670 may include drivers for word line layers in a 3D configuration, select transistors (e.g., SGS and SGD transistors) and source lines. The power control module 670 may include one or more charge pumps for creating voltages.

The control circuitry 615, the state machine 660, the on-chip address decoder 665, the first decoder 625, the second decoder 630, the power control module 670, the sense blocks 635, the read/write circuits 620, and/or the controller 640 may be considered one or more control circuits and/or a managing circuit that perform some or all of the operations described herein.

In an example, the controller 640, is an electrical circuit that may be on-chip or off-chip. Additionally, the controller 640 may include one or more processors 680, ROM 685, RAM 690, memory interface 695, and host interface 675, all of which may be interconnected. In an example, the one or more processors 680 is one example of a control circuit. Other examples can use state machines or other custom circuits designed to perform one or more functions. Devices such as ROM 685 and RAM 690 may include code such as a set of instructions. One or more of the processors 680 may be operable to execute the set of instructions to provide some or all of the functionality described herein.

Alternatively or additionally, one or more of the processors 680 may access code from a memory device in the memory structure 610, such as a reserved area of memory cells connected to one or more word lines. The memory interface 695, in communication with ROM 685, RAM 690, and one or more of the processors 680, may be an electrical circuit that provides an electrical interface between the controller 640 and the memory die 605. For example, the memory interface 695 may change the format or timing of signals, provide a buffer, isolate from surges, latch I/O, and so forth.

The one or more processors 680 may issue commands to control circuitry 615, or any other component of memory die 605, using the memory interface 695. The host interface 675, in communication with the ROM 685, the RAM 690, and the one or more processors 680, may be an electrical circuit that provides an electrical interface between the controller 640 and the host 645. For example, the host interface 675 may change the format or timing of signals, provide a buffer, isolate from surges, latch I/O, and so on. Commands and data from the host 645 are received by the controller 640 by way of the host interface 675. Data sent to the host 645 may be transmitted using the data bus 650.

Multiple memory elements in the memory structure 610 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Examples of the present disclosure describe a method, comprising: receiving a read command from a host device, the read command being associated with preloaded content that is stored by a data storage device; based, at least in part, on receiving the read command, determining an operating temperature of the data storage device; selecting, based at least in part, on the determined operating temperature, one of a first copy of the preloaded content that is associated with a first write temperature and a second copy of the preloaded content that is associated with a second write temperature that is different than the first write temperature; decoding the selected one of the first copy of the preloaded content or the second copy of the preloaded content; and returning the decoded selected copy of the preloaded content to the host device. In an example, the first copy of the preloaded content is written to the data storage device at the first write temperature when the data storage device is operating at an operating temperature associated with the first write temperature. In an example, the first copy of the preloaded content is written to the data storage device using write parameters that simulate an operating temperature associated with the first write temperature. In an example, the method also includes determining whether to delete the first copy of the preloaded content from the data storage device. In an example, the determination is based, at least in part, on an access frequency of the first copy of the preloaded content. In an example, the determination is based, at least in part, on an amount of available storage space in the data storage device. In an example, the method also includes deleting the first copy of the preloaded content from the data storage device during a background operation. In an example, the first copy of the preloaded content is a subset of the preloaded content.

Examples also describe a data storage device, comprising: a controller; and a cross-temperature mitigation system operable to: determine an operating temperature of the data storage device; and select, based at least in part, on the determined operating temperature, one of a first copy of preloaded content that is associated with a first write temperature and a second copy of preloaded content that is associated with a second write temperature that is different than the first write temperature; decode the selected one of the first or second copy of preloaded content; and return the decoded copy of the preloaded content to a host device. In an example, the data storage device also includes a temperature detection system operable to provide the operating temperature of the data storage device to the cross-temperature mitigation system. In an example, the first copy of preloaded content and the second copy of preloaded content are stored on the data storage device during a factory setting. In an example, the first copy of preloaded content is written to the data storage device at the first write temperature when the data storage device is operating at an operating temperature associated with the first write temperature. In an example, the first copy of preloaded content is written to the data storage device using write parameters that simulate an operating temperature associated with the first write temperature. In an example, the cross-temperature mitigation system is further operable to determine whether to delete the first copy of preloaded content from the data storage device. In an example, the determination is based, at least in part, on an access frequency of the first copy of preloaded content. In an example, the determination is based, at least in part, on an amount of available storage space in the data storage device. In an example, the first copy of preloaded content is a subset of preloaded content.

Additional examples describe a data storage device, comprising: a controller means; means for determining an operating temperature of the data storage device; means for selecting one of a first copy of preloaded content that is associated with a first write temperature and a second copy of preloaded content that is associated with a second write temperature that is different than the first write temperature, wherein the selection is based, at least in part, on the determined operating temperature of the data storage device; means for decoding the selected one of the first copy of preloaded content or the second copy of preloaded content; and means for returning the decoded selected copy of the preloaded content to the host device. In an example, the first copy of preloaded content and the second copy of preloaded content are stored on the data storage device during a factory setting. In an example, the first copy of preloaded content is written to the data storage device at the first write temperature using write parameters that simulate an operating temperature associated with the first write temperature.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/ or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:

receiving a read command from a host device, the read command being associated with preloaded content that is stored by a data storage device;

based, at least in part, on receiving the read command, determining an operating temperature of the data storage device;

selecting, based at least in part, on the determined operating temperature, one of a first copy of the preloaded content that is associated with a first write temperature and a second copy of the preloaded content that is associated with a second write temperature that is different from the first write temperature;

decoding the selected one of the first copy of the preloaded content and the second copy of the preloaded content;

returning the decoded selected copy of the preloaded content to the host device;

updating an access frequency of the selected one of the first copy of the preloaded content and the second copy of the preloaded content;

updating a list of detected read temperatures based, at least in part, on the determined operating temperature of the data storage device; and selecting at least one of the first copy of preloaded content and the second copy of preloaded content to be deleted based, at least in part, on the access frequency of the selected one of the first copy of the preloaded content and the second copy of the preloaded content and the list of detected read temperatures.

2. The method of claim 1, wherein the first copy of the preloaded content is written to the data storage device at the first write temperature when the data storage device is operating at an operating temperature associated with the first write temperature.

3. The method of claim 1, wherein the first copy of the preloaded content is written to the data storage device using write parameters that simulate an operating temperature associated with the first write temperature.

4. The method of claim 1, further comprising determining whether to delete at least one of the first copy of the preloaded content and the second copy of the preloaded content from the data storage device.

5. The method of claim 4, wherein the determination is based, at least in part, on an amount of available storage space in the data storage device.

6. The method of claim 1, further comprising deleting the selected one of the first copy of the preloaded content and the second copy of the preloaded content from the data storage device during a background operation.

7. The method of claim 1, wherein the first copy of the preloaded content is a subset of the preloaded content.

8. The method of claim 1, wherein selecting the at least one of the first copy of preloaded content and the second copy of preloaded content to be deleted is further based, at least in part, on one or more performance metrics associated with each of the first copy of preloaded content and the second copy of preloaded content.

9. The method of claim 1, further comprising performing an error correction operation on a copy of preloaded content using the copy of preloaded content that is selected to be deleted.

10. A data storage device, comprising:

a cross-temperature mitigation system operable to:

determine an operating temperature of the data storage device;

select, based at least in part, on the determined operating temperature, one of a first copy of preloaded content that is associated with a first write temperature and a second copy of preloaded content that is associated with a second write temperature that is different from the first write temperature;

return a decoded copy of the selected one of the first copy of preloaded content and the second copy of preloaded content to a requesting device;

update a frequency order of the first copy of preloaded content and the second copy of preloaded content based, at least in part, on the selection of one of the first copy of preloaded content and the second copy of preloaded content and the determined operating temperature, wherein the frequency order indicates which copy of preloaded content will be erased in response to a triggering event associated with the data storage device; and in response to detecting the triggering event, erasing one of the first copy of preloaded content and the second copy of preloaded content in an order specified by the frequency order, the frequency order being based, at least in part, on the determined operating temperature.

11. The data storage device of claim 10, further comprising a temperature detection system operable to provide the operating temperature of the data storage device to the cross-temperature mitigation system.

12. The data storage device of claim 10, wherein the first copy of preloaded content and the second copy of preloaded content are stored on the data storage device during a factory setting.

13. The data storage device of claim 12, wherein the first copy of preloaded content is written to the data storage device at the first write temperature when the data storage device is operating at an operating temperature associated with the first write temperature.

14. The data storage device of claim 12, wherein the first copy of preloaded content is written to the data storage device using write parameters that simulate an operating temperature associated with the first write temperature.

15. The data storage device of claim 10, wherein the first copy of preloaded content is a subset of preloaded content.

16. The data storage device of claim 10, wherein the triggering event is the data storage device reaching a capacity threshold.

17. The data storage device of claim 10, wherein the data storage device is further configured to use the copy of preloaded content that will be erased as part of an error correction operation performed on another copy of preloaded content.

18. A data storage device, comprising:

means for determining an operating temperature of the data storage device;

means for selecting one of a first copy of preloaded content that is associated with a first write temperature and a second copy of preloaded content that is associated with a second write temperature that is different from the first write temperature, wherein the selection is based, at least in part, on the determined operating temperature of the data storage device;

means for decoding the selected one of the first copy of preloaded content and the second copy of preloaded content;

means for returning the decoded selected copy of the preloaded content to a requesting device; and means for updating an access frequency of the selected one of the first copy of the preloaded content and the second copy of the preloaded content;

means for updating a list of detected read temperatures associated with the operating temperature of the data storage device; and means for determining whether at least one of the first copy of the preloaded content and the second copy of preloaded content will be deleted in response to the data storage device reaching a capacity threshold, wherein the determination as to whether the at least one of the first copy of the preloaded content and the second copy of preloaded content will be deleted is based, at least in part, on the list of detected read temperatures.

19. The data storage device of claim 18, wherein the first copy of preloaded content and the second copy of preloaded content are stored on the data storage device during a factory setting.

20. The data storage device of claim 18, wherein the first copy of preloaded content is written to the data storage device at the first write temperature using write parameters that simulate an operating temperature associated with the first write temperature.

* * * * *